Oct. 9, 1928.

C. H. M. BULL 1,686,957

ROLLER BIT

Filed May 20, 1927

INVENTOR.
Clinton H.M. Bull.
BY Vincent Martin
ATTORNEY.

Patented Oct. 9, 1928.

1,686,957

UNITED STATES PATENT OFFICE.

CLINTON H. M. BULL, OF HOUSTON, TEXAS, ASSIGNOR TO REED ROLLER BIT COMPANY, OF HOUSTON, TEXAS, A CORPORATION OF TEXAS.

ROLLER BIT.

Application filed May 20, 1927. Serial No. 192,846.

This invention relates to deep well drilling apparatus, and more particularly to roller bits.

The invention has for its object the provision in a roller bit of roller cutters disposed in a new and improved manner.

It is also the object of the invention to provide new and improved means to mount roller cutters in bit heads.

The invention has, as a further object, provision of a shield whereby accumulation between roller cutters of matter drilled thereby will be prevented.

Various other objects will appear from the following description.

Figure 1:
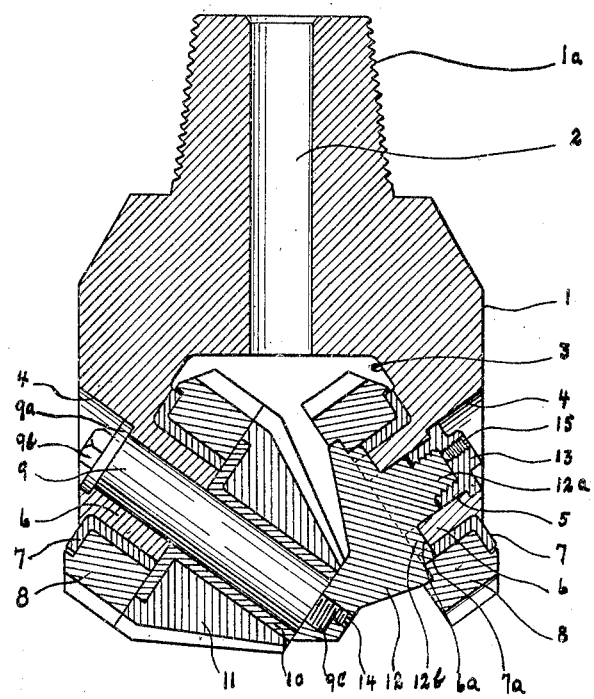
Figure 2:
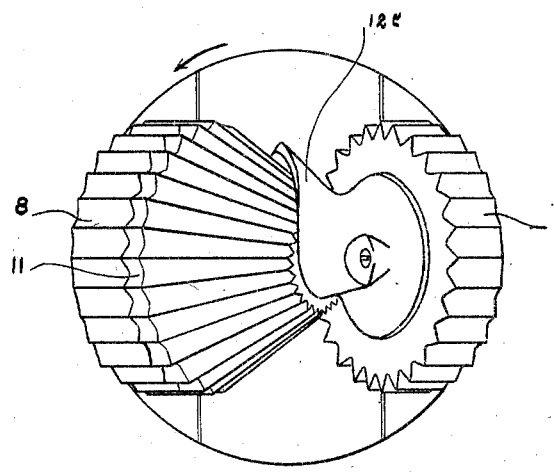

The accompanying drawings are illustrative of the preferred embodiment of the invention. Fig. 1 is a sectional elevation of the bit, and Fig. 2 a bottom plan view thereof.

Referring specifically to the drawings, the bit head is indicated at 1, and has a shank 1ª adapted to be screwed into the usual pipe, not shown. A water course 2 discharges into a recess in the bottom of the head having oppositely inclined side walls 3.

The head is also provided with recesses 4 in the sides thereof from which recesses inwardly and downwardly inclined bores 5 lead to the recess in the bottom of the head. Annular flanges 6 are formed on the head adjacent said bores. Upon each of these flanges is a bushing 7 having a circumferential base flange, and upon these bushings are mounted side roller cutters 8, said cutters being slightly recessed to receive the flanges of said bushings.

Extending through one of the bores 5 is a spindle 9 which has mounted on the inner end thereof a bushing 10 of a form like that of bushing 7, and upon bushing 10 is mounted a comparatively large frusto-conical cutter 11.

Pin 9 has an annular flange 9ª on the outer end thereof, and a squared projection 9ᵇ projecting from said flange, said flange resting against the bottom of recess 4 and said projection 9ᵇ being adapted to be engaged by a tool to move spindle 9 from the head. Spindle 9 has a reduced screw-threaded inner end 9ᶜ screwed into a support 12.

Support 12 has a shank 12ª fitting in bore 5, and upon the end of this shank a nut 13 is screw-threaded, said nut having a flange resting against the bottom of recess 4. Support 12 may be provided with a set screw 14, and nut 13 with a set screw 15 to respectively lock support 12 on pin 9, and nut 13 on shank 12ª.

Support 12, it will be observed, has a key 12ᵇ thereon, and key 12ᵇ fits in diametrical slots 6ª and 7ª of annular flange 6 and bushing 7, respectively, thereby to lock support 12 and bushing 7 against rotation with respect to the head.

Support 12 has a curved shield 12ᶜ integral therewith and extending partially around cutter 11, to prevent the inward movement of matter between the teeth and the consequent accumulation thereof between the cutters.

Bushings 7, 7 and 10 are of a greater width than cutters 8, 8 and 11, respectively, so that the latter will not be locked on the former, but instead will freely revolve thereon.

The advantages of placing one large cutter 11 between the side roller cutters 8 will at once be apparent to those skilled in the art. In the type of bit embodying a plurality of cross roller cutters extending diametrically across the recess in the bottom of the head and between side roller cutters, unequal rotation of said cross roller cutters, due to the difference in circumference of the circles they respectively define, causes unequal cutting and consequently unequal wear. This invention provides a novel disposition of and support for a comparatively large cutter which will efficiently operate upon the middle portion of the bottom of the hole, and a shield to direct the cuttings thrown by said cutter.

The single pin 9 is made large and strong, bore 5 and annular flange 6 firmly support said pin, cutters 8 and 11 are so arranged thereon that they provide mutual support, and the inner end of said pin is strongly supported by support 12. The circular portion of support 12 rests firmly upon and is keyed to flange 6 and bushing 7, and also rests in the inner recessed end of cutter 8. Shank 12ª is locked in bore 5 by nut 13.

It will be seen from the foregoing that the disposition and support of the cutters is such that the cutters will easily withstand the strong forces which are exerted against the cutters of roller bits when they are in operation.

And the parts are easily and quickly assembled and separated.

The assembly thereof may be effected as follows: Bushing 7 is slipped on flange 6. Cutter 8 is slipped on bushing 7. Shank 12ª of support 12 is inserted in bore 5 and nut 13 screwed thereon. Set screw 15 is screwed in to lock nut 13. Key 12ᵇ meanwhile entered slots 6ª and 7ª. The other bushing 7 and cutter 8 are then slipped on flange 6, cutter 11 held adjacent cutter 8 and pin 9 slipped through cutters 8 and 11. A tool is made to engage squared projection 9ᵇ, and reduced screw-threaded end 9ᶜ screwed into support 12. Set screw 14 is then screwed in to lock pin 9 in place.

To separate the parts, the foregoing steps are reversed.

Shield 12ᶜ effectively directs the cuttings from cutter 11 upwardly into the path of water discharging from course 2 and accumulation of such cuttings between the cutters is thereby prevented.

The invention is not limited to the specific embodiment illustrated and described. Various alterations may be made without departure from the scope of the following claims:

I claim:

1. In a rotary boring drill, a head having a recess, a long spindle in said recess, a cutter on said spindle adjacent said head, a second cutter frusto-conical in form, and larger than the first-mentioned cutter and mounted on said spindle adjacent the end thereof, and a second spindle in said recess opposite and of less length than said first-mentioned spindle, and a cutter on said second spindle smaller than said frusto-conical cutter.

2. In a rotary boring drill, a head having a recess, side cutters in said recess, and a center cutter between said side cutters, said center cutter being larger than either of said side cutters, and being disposed in an inclined position.

3. In a rotary boring drill, a head having a recess, side cutters in said recess, and a center cutter between said side cutters, said center cutter being larger than either of said side cutters, and being frusto-conical in form and disposed in an inclined position.

4. In a rotary boring drill, a head having a recess, and a pair of downwardly and inwardly disposed bores communicating with said recess, the opposite walls of said recess having annular flanges adjacent the inner ends of said bores, a pin in one of said bores, and a support secured to the inner end of said pin and extending into the other of said bores, and cutters on said pin and flanges.

5. In a rotary boring drill, a head having a recess, an annular flange on one wall of said recess, a pin extending from the opposite wall of said recess, cutters on said flange and pin, and a removable device to hold said cutters on said flange and pin and to support said pin.

6. In a rotary boring drill, a head having a bore and an annular flange adjacent said bore, a cutter on said flange, a pin having one end supported by that side of said head opposite said flange and bore, a cutter on said pin, and a support secured to the inner end of said pin, said support resting in said bore and having an enlarged portion to rotatably hold said cutter on said flange.

In testimony whereof, I hereunto affix my signature.

CLINTON H. M. BULL.